Patented Sept. 24, 1929

1,728,998

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

PRODUCTION OF DYESTUFFS CONTAINING CHROMIUM

No Drawing. Application filed February 3, 1928, Serial No. 251,754, and in Germany February 12, 1927.

I have found that very fast dyestuffs containing chromium are obtained by allowing compounds of trivalent chromium to act upon the o-hydroxyazo dyestuffs obtainable from diazotized 4-chlor-2-aminophenol and naphthol-monosulfonic acids. The chroming of the dyestuffs may be effected by boiling under a reflux condenser or by heating in an autoclave under pressure. The resulting dyestuffs containing chromium dye wool reddish to bluish violet shades, fast to washing and milling, and also very fast to light; they also possess the property of dyeing very evenly.

The following examples will further illustrate how the said invention may be carried into practical effect but the invention is not limited thereto. The parts are by weight.

Example 1

400 parts of the azo dyestuff obtainable from diazotized 4-chlor-2-aminophenol and 2.6 naphthol-sulfonic acid corresponding to the formula:

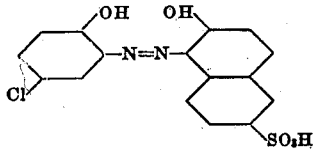

in aqueous solution, are heated for from 3 to 4 hours in an autoclave at 125° centigrade with 350 parts of a chromium oxid paste, containing 26 per cent of $Cr_2O_3$, and 170 parts of 85 per cent formic acid, salting-out being then effected in the usual way after cooling to between about 30° and 40° centigrade. The resulting dyestuff containing chromium gives fast, handsome red violet dyeings on wool. The corresponding chromed dyestuff obtainable from diazotized 4-chlor-2-aminophenol and 2.4-naphthol-sulfonic acid dyes wool with an appreciably bluer tinge, of similar fastness.

Example 2

400 parts of the azo dyestuff obtainable from diazotized 4-chlor-2-aminophenol and 1.5-naphthol-sulfonic acid are boiled for about 17 to 20 hours under a reflux condenser with the same weights of chromium oxid paste and formic acid as specified in Example 1, until chroming is complete, the chromium compound being then precipitated by salting out with common salt. The compound so produced gives fast violet dyeings on wool. The corresponding chromium compound of the azo dyestuff obtainable from diazotized 4-chlor-2-aminophenol and 1.4-naphthol-sulfonic acid gives dyeings with a more reddish tinge on wool.

What I claim is:

1. As new articles of manufacture the chromium compounds of the o-hydroxy-azo dyestuffs obtainable from diazotized 4-chlor-2-aminophenol and a naphthol mono-sulfonic acid, dyeing wool fast reddish to bluish violet shades.

2. As a new article of manufacture the chromium compound of the o-hydroxy-azo dyestuff 4-chlor-1-phenol-2-azo-(1')-2'-naphthol-6'-sulfonic acid dyeing wool fast red violet shades.

In testimony whereof I have hereunto set my hand.

HANS KRZIKALLA.